July 8, 1958     J. J. BOOTH ET AL     2,842,400
DIAPHRAGM TYPE SOLENOID DELIVERY VALVE
Filed July 23, 1956                          4 Sheets-Sheet 3

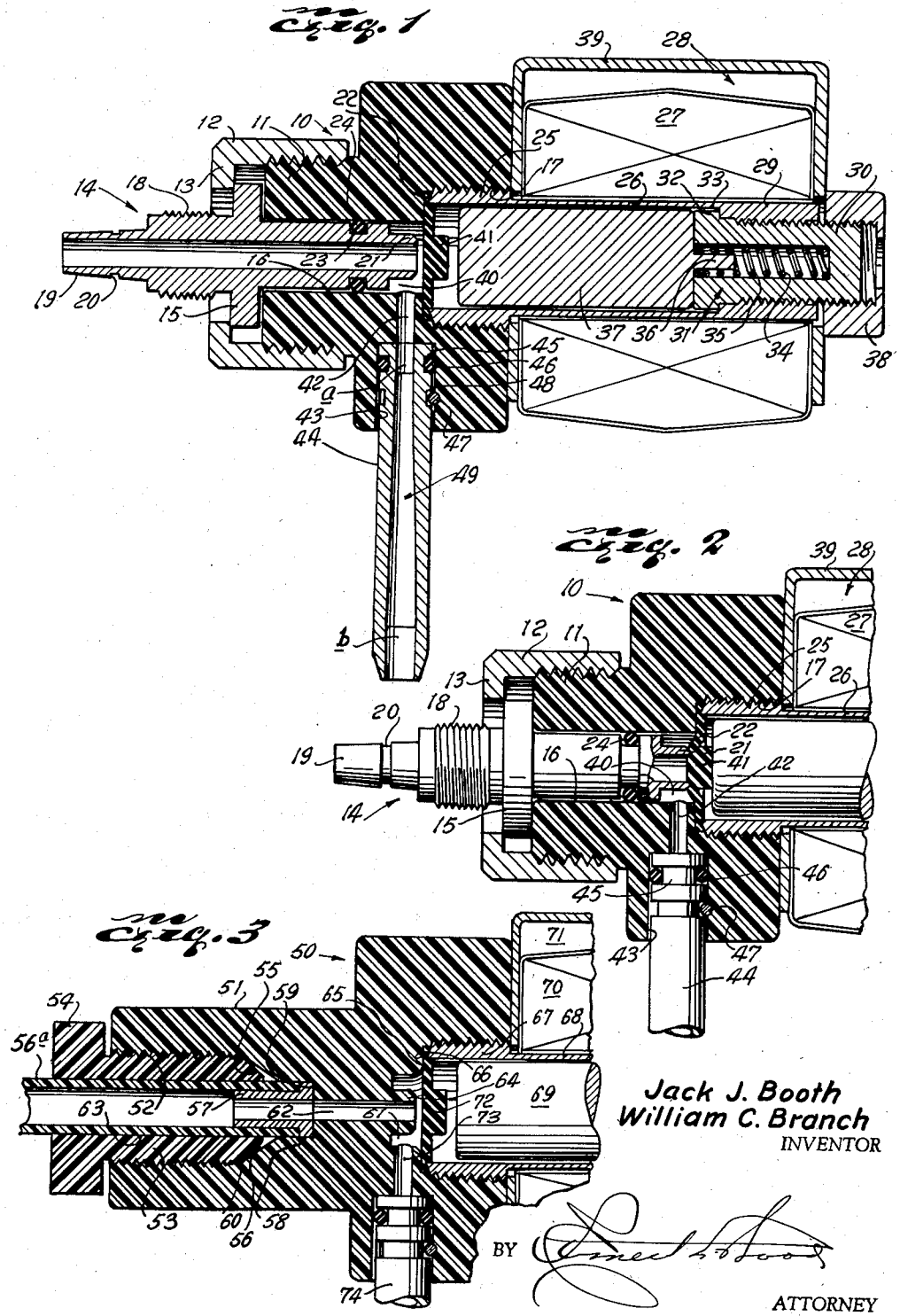

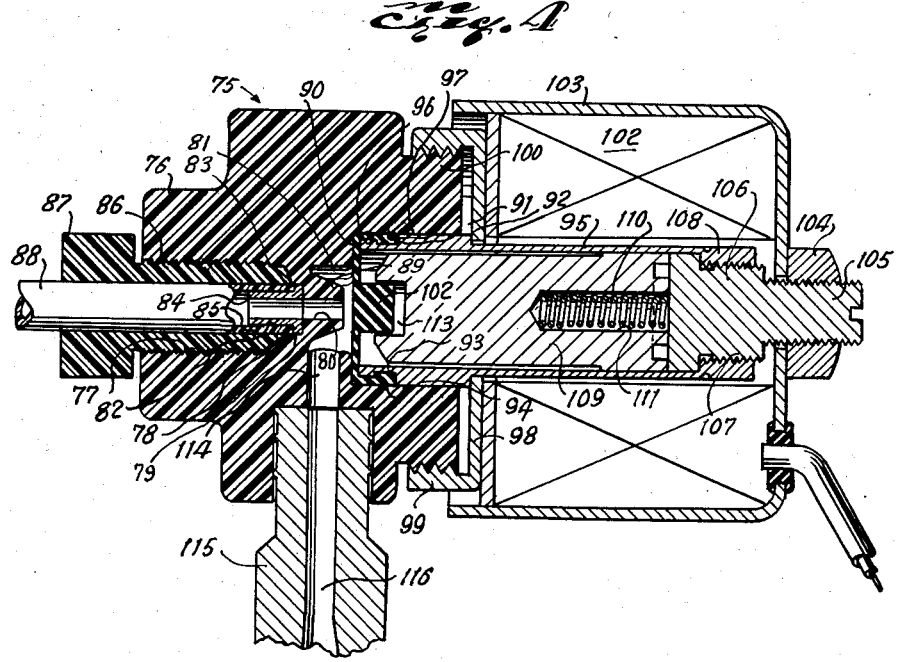
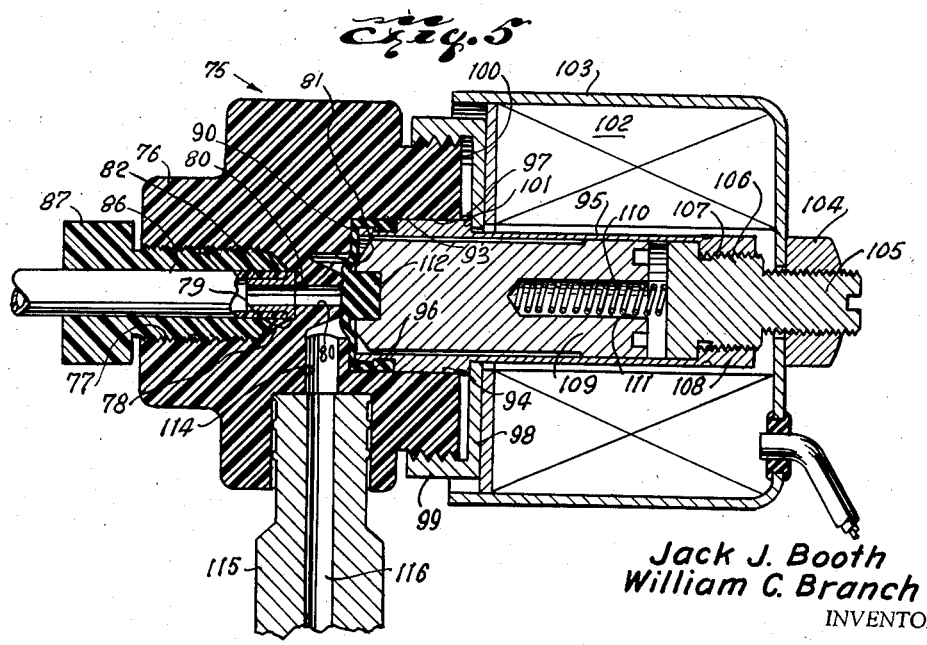

Jack J. Booth
William C. Branch
INVENTOR

BY
ATTORNEY

July 8, 1958  J. J. BOOTH ET AL  2,842,400
DIAPHRAGM TYPE SOLENOID DELIVERY VALVE
Filed July 23, 1956  4 Sheets-Sheet 4
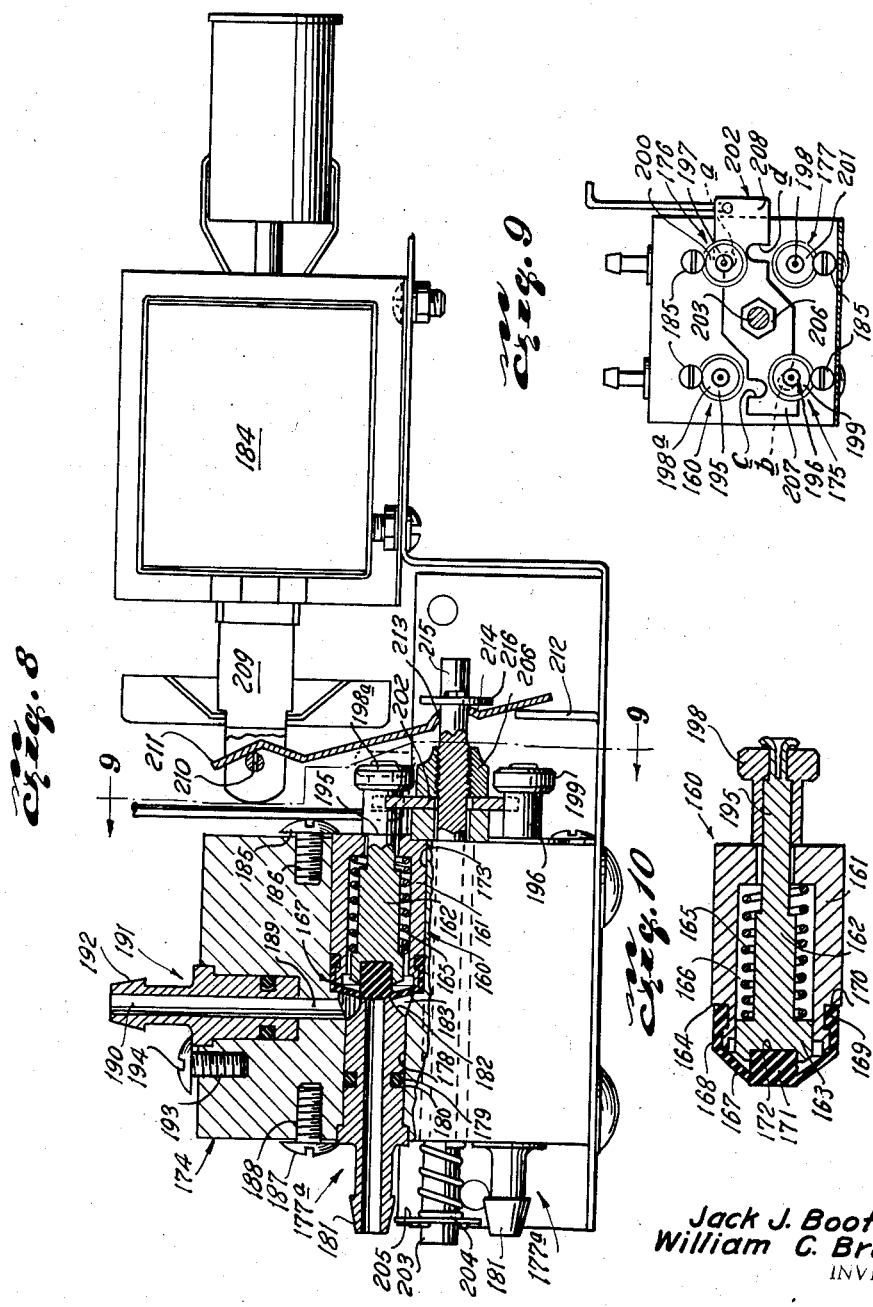
Jack J. Booth
William C. Branch
INVENTOR
BY
ATTORNEY United States Patent Office 2,842,400
Patented July 8, 1958

2,842,400

DIAPHRAGM TYPE SOLENOID DELIVERY VALVE

Jack J. Booth and William C. Branch, Dallas, Tex.

Application July 23, 1956, Serial No. 599,509

2 Claims. (Cl. 299—149)

This invention relates to electro-magnetic valves and more particularly to solenoid valves for beverage vending and dispensing machines.

The principal object of the invention is to provide a spigot type valve constructed of non-corrosive and non-conductive materials to adapt the same for use in dispensing carbonated beverages, the said valve being equipped with a nozzle or spout so designed as to hold back pressure on the area of the greatest agitation and expansion where the compressible fluid ($CO_2$) converges into a diaphragm area and yet allow liquid to progressively expand as it loses velocity so that at the discharge end of the nozzle, where there is provided a straight section several times the area of the inlet end thereof, the liquid will emerge in a slow, non-turbulent stream.

Another and equally important object of the invention is to provide, in a valve of the type set forth, a sealed area between the high pressure product and any moving mechanism within the valve body which, if exposed to the product will become stuck or difficult to operate because of the viscosity of the syrup content of the product. A positive seal for this purpose is attained through the medium of a Neoprene diaphragm designed and constructed to snap onto the plunger of the solenoid which actuates the valve, the diaphragm not only functioning to shut off the flow of the product but also seals the metal operating parts of the valve from the product, making possible the use of materials less costly than those offering greater resistance to the corrosive effects of the product and, being isolated from the product by the diaphragm, the product is unaffected by the said materials.

Another object of the invention is to provide a valve wherein the diaphragm area is self cleaning because of the frequent washing by the $CO_2$ water and its dissolving action on the syrup.

Still another object of the invention is to provide a solenoid valve especially useful in the dispensing of carbonated beverages by virtue of the foregoing characteristics as well as the fact that by virtue of the "snap-on" type of diaphragm preferred herein, replacement of diaphragms and other parts can be effected rapidly and economically by an unskilled person servicing a vending machine with the assurance that even if the parts holding the diaphragm are not brought up right there will still be no leakage past the diaphragm. Further, in view of the novel design of the valve which prevents "jack-potting" of beverage from the machine, that is to say, an uncontrolled flow of beverage through the valve, the Sanitary Code of municipalities is adequately met.

Other objects will appear as the description proceeds when considered with the annexed drawing, wherein:

Fig. 1 is a vertical sectional view of one form of the valve of the invention showing the solenoid plunger retracted to open the valve.

Fig. 2 is a similar but fragmentary sectional view of the same valve in closed position of the solenoid plunger.

Fig. 3 is a view similar to Fig. 2 showing the valve open but disclosing a modified form of product inlet nipple and seal.

Fig. 4 is a modified form of the valve shown in Fig. 1 to 3, the valve being shown in open position.

Fig. 5 is a view similar to Fig. 4 but showing the valve closed.

Fig. 8 is a sectional view of still another modification of the invention showing the valve in its typical environment in a beverage dispenser, parts of which latter are shown in section.

Fig. 9 is a view on a reduced scale taken on line 9—9 of Fig. 8, and

Fig. 10 is a longitudinal sectional view of the valve per se on a larger scale.

Figure 6:
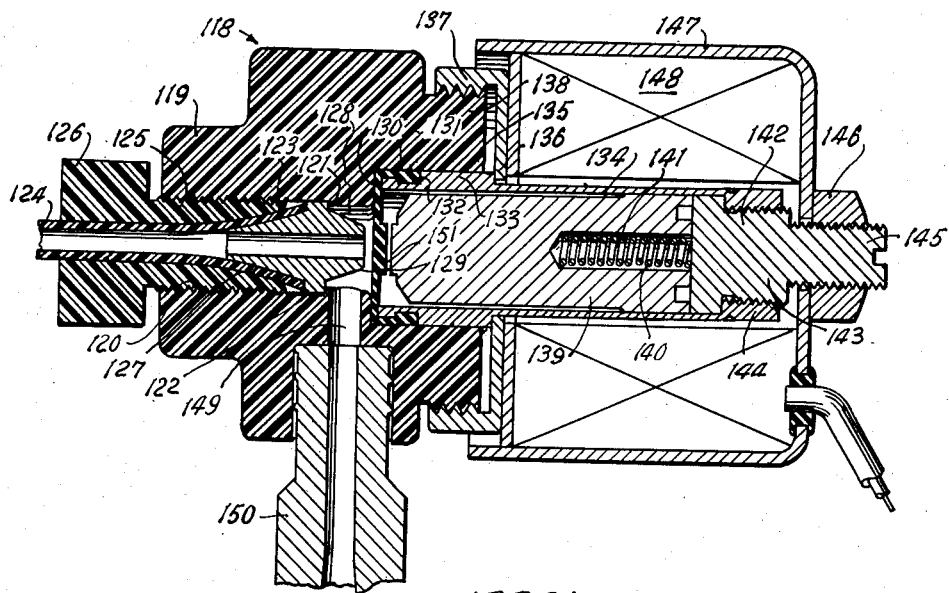
Fig. 6 is another modification of the invention showing the valve in vertical section in open position.

The four different forms of the valve herein disclosed have one feature in common which is an essential to the continued successful performance of such a valve in a machine for dispensing or vending beverages. This feature includes the diaphragm in the particular position to serve both as a means to positively shut off the flow of product and to preclude seepage of the product from the seating area into the space occupied by the solenoid plunger which is normally under spring action to move the diaphragm against the product inlet nipple in closing the valve. Uncontrolled flow of beverage from the storage tanks of a vending machine is not uncommon in such machines whose valves are subject to fouling by deposits of syrup which congeal and harden, preventing free and unrestricted functioning of parts. This obviously creates an unsanitary condition objected to by health authorities and is costly to the machine operators. The present invention has successfully overcome the condition chiefly by the design of the valve body and the construction and relationship of parts, the body having a straight bore entirely therethrough, enabling the inlet nipple, and seat, occupying one end of the bore and the plunger and sleeve within the opposite end of the bore to be quickly and conveniently removed for frequent cleaning as required under most sanitary ordinances. In addition to the above distinguishing feature, the invention possesses the added feature of an improved spout or dispensing nozzle which widens at its outlet end to prevent building up of pressure against the diaphragm and holding open the valve and insures against excessive foaming or ebullience of the beverage as it flows into the waiting cup in a vending machine. Such a condition is caused by changing pressures, velocity and temperatures as the beverage flows from storage to cup and are factors taken into consideration in the designing of the improved nozzle.

Continuing with a more detailed description of the drawing, reference is primarily made to Figs. 1 and 2 in which numeral 10 denotes generally the valve body which is preferably molded from a plastic material known to possess no substance having deleterious effects on a carbonated beverage. The body 10 is formed with an externally threaded extension 11 which receives a collar 12 having an annular, inwardly turned flange 13 which bears against an annular external flange 14 formed on a product inlet nipple 15 intermediate its ends, thus holding said nipple in place in an axial bore 16 through the extension 11 into a cavity or bore 17 of larger diameter which opens at the end of the body 10 opposite the said extension 11 and which bore 17 is threaded, as shown.

The inlet nipple 14 is further formed with an externally threaded portion 18, and a tapered end 19 which is annularly grooved as at 20 to provide for the attachment thereto of a product line, not shown. The opposite end 21 of the nipple 14 is of reduced diameter and is chamfered to provide a better seal when a diaphragm 22 is thrust thereagainst in a manner to be presently explained. Spaced inwardly of the said chamfered end 21 is an annular groove 23 containing an O-ring seal 24 which bears against the wall of the bore 16 to prevent product from backing up into the bore past the said nipple 14.

Threaded into the bore 17 is the enlarged end 25 of a sleeve 26 which extends through the core of the coil 27 of a solenoid 28. The opposite end of the sleeve 26 is internally threaded as at 29 (Fig. 1) through which is threaded the stem 30 of a spring retaining member 31. This member has an annular shoulder 32 which bears against an annular shoulder 33 at the inner end of the threaded section 29 of the sleeve 26. An axial bore 34 extends from the inner end of the member 31, terminating short of the opposite or outer end thereof and contains a coil spring 35 whose outer end bears against the closed end of the bore 34. The opposite or inner end of the spring 35 surrounds an extension 36 on the outer end of a solenoid plunger 37 which reciprocates in the sleeve 26 as the solenoid coil 27 is energized and deenergized. A nut 38 is threaded onto the extended end of the stem 30 and bears against one end of a solenoid housing 39, clamping the same and the solenoid coil 27 between the nut 38 and the body 10 of the valve.

The spring 35 normally urges the plunger 37 toward the diaphragm 22 which is held in place by the sleeve 26 whose inner end 25 compresses the diaphragm about its perimeter against the base of the enlarged bore or cavity 17. The valve is thus held closed against the passage of the product into the seating area and fluid transition chamber 40 until the solenoid coil 27 is energized to retract the plunger 37 against the resistance of the spring 35. The diaphragm 22 has a centrally located integral boss 41 thereon which thickens and reinforces the center area of the diaphragm where it is compressed between the plunger 37 and the end 22 of the inlet nipple 14, insuring a better seal when the valve is closed.

The body 10 of the valve has an outlet bore 42 which communicates with the seating area 40 or the bore 16. A counterbore 43 is made axially with the bore 42 and receives the inlet end of a nozzle consisting of a tube 44 having an annular groove 45 therein containing an O-ring 46 which bears against the wall of the bore 43. A pin 47 extends through the body 10 transversely of the tube 44 and lies in one side of an annular groove 48 in the tube below the groove 45. Thus, the tube is held in place in the bore 43.

The axial fluid passage 49 through the tube or nozzle 44 is made to have different diameters, becoming progressively larger from its inlet to its outlet or discharge end. At the inlet end, the passage 49 has a straight walled portion *a* which is of the same diameter as the bore 42 with which it communicates. Beginning with the portion *a*, the passage 49 has tapering walls gradually increasing from 0° to substantially 6° where a straight walled portion *b* begins, continuing to the discharge end of the nozzle. This arrangement is such that back pressure is held on the area 40 which is the area of agitation and expansion and yet allows the carbonated beverage to progressively expand as it loses velocity so that when it passes through the straight walled portion *b* of the passage 49, it discharges in a slow, non-turbulent stream into a waiting cup, not shown, without foaming.

In Fig. 3 is shown substantially the same valve structure just described and illustrated in Figs. 1 and 2, the difference existing only in the product inlet portion thereof. In this form of the invention, the valve body generally indicated by reference numeral 50 has an elongated extension 51 which has a threaded bore 52 receiving a threaded stem 53 of flexible plastic, integral with a nut 54, which, when rotated to thread the stem inwardly, causes the tapered end 55 of the stem to be advanced against the beveled end 56 of the threaded bore 52 and clampingly engage the fluid inlet tube 56a attached at one end to a fitting 57 which has a flange 58 bearing against a shoulder 59 in the bore 52. The bore is thus sealed by the compressed end of the stem 53, preventing backing up of the product passing into the seating area 61 through the product inlet passage 62 which is axial with the bore 63 through the stem 53.

The seating area 61 of the body is formed to produce a seat 64 for a diaphragm 65 whose perimeter is clamped between a shoulder 66 concentric with the seat 64 and the inner exteriorly threaded end 67 of a sleve 68. The sleeve 68 houses the plunger 69 of a solenoid coil 70 contained in a housing 71.

The diaphragm 65, being highly flexible, has a centrally disposed, reinforcing boss 72 which provides a thickened portion where the plunger engages the diaphragm to urge the same into engagement with the seat 65 to close the bore 62 against passage of the product into the seating area 61. When the plunger is retracted by energization of the solenoid 70, it overcomes the force of a spring, not shown, but similar to the spring 35 in Fig. 1, relieving pressure on the diaphragm and permitting fluid to flow through the passage 73 in the body 50, which communicates with the seating area 61 and with a nozzle 74 of the same construction as the nozzle 44 shown in Fig. 1.

Referring now to Figs. 4 and 5, the valve body is generally indicated by reference numeral 75 which is formed with an extension 76, provided with a threaded bore 77. The bore 77 is tapered at 78, becoming straight walled in a bore 79 which communicates axially with a passage 80 entering the seating area and fluid transition chamber 81. A fitting 82 seats in the bore 79 against a shoulder 83 and has a reduced portion 84 about which the end 85 of a product inlet tube 86 is compressed when a nut 87, integral with the stem, is turned, thus clamping the tube 86 in place.

In the seating area 81 of the body 75 is formed a tapered seat 89 against which is moved a diaphragm 90 of Neoprene or an equivalent material. The diaphragm is cup-shaped, the same being formed with an annular flange 91 which latter has an internal, annular bead 92, the said flange and bead occupying an annular groove or recess 93 made in the end 94 of a sleeve 95. The diaphragm itself is disposed in a counterbore 96 in the body 75 adjacent the seating area 81 while the end of the sleeve 95 extends into a larger counterbore 97 made in the body 75 opposite the extension 76.

The sleeve 95 is held in place by the internal annular flange 98 of a nut 99 which is threaded onto a reduced portion 100 of the body 75, extending oppositely to the extension 76. The flange 98 bears against an annular shoulder 101 on the sleeve 95 (Fig. 5) urging the same inwardly into clamping engagement with the snap-on diaphragm, holding the same firmly in place.

A solenoid coil 102 is contained in a housing 103 which is held in position by a nut 104, threaded onto a stem 105 of a spring retaining member 106. The member 106 has an enlarged intermediate threaded portion 107 whose threads engage the internal threads in the outer end 108 of the sleeve 95. The nut 104 bears against the outer end of the solenoid housing 103 holding the same in place on the body 75.

Reciprocable within the sleeve 95 is a solenoid plunger 109 and this plunger is normally urged into engagement with the diaphragm 90 by means of a coil spring 110 arranged in an axial bore 111 in the plunger whose outer end bears against the spring retainer 106 and whose inner end bears against the inner end of the bore 111. The action of the spring moves the plunger against the diaphragm and the diaphragm against the seat 89, as shown in Fig. 5. The diaphragm has a circular boss 112 integral with its center area which is slidable within a cavity 113 in the end of the plunger. This arrangement serves to prevent warping or distortion of the diaphragm under pressure and reinforces the same against the seat 89.

When the coil 102 is energized the plunger is retracted against the resistance of the spring 110, permitting the pressure of the product in the passage 80 to move the diaphragm away from the seat 89 so that the product will flow into the seating area 81 and into the passage 114 with which communicates the discharge nozzle 115 having an axial fluid passage 116.

Figure 7:
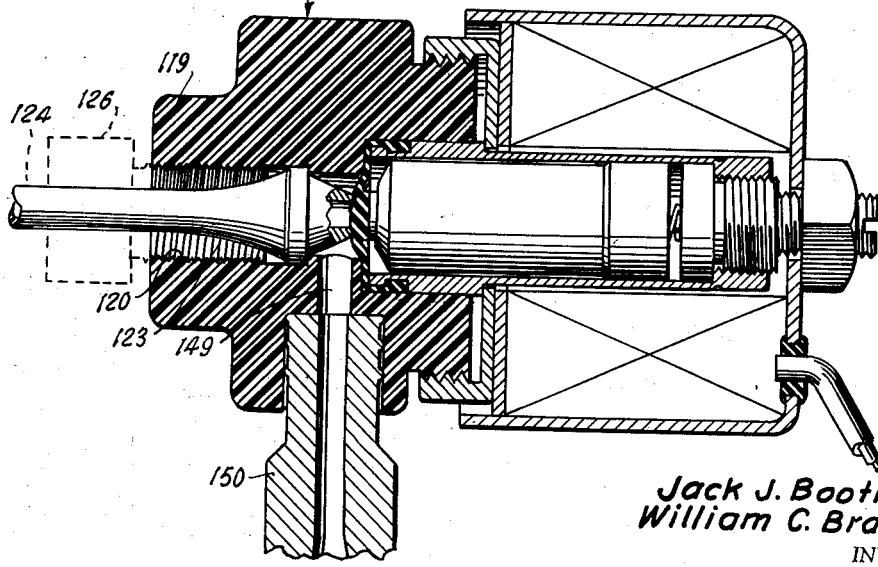
Fig. 7 is a view similar to Fig. 6 in which the valve is shown in closed position.

In Figs. 6 and 7 is shown a further modification of the invention. The valve therein shown differs from the valve illustrated in Figs. 4 and 5 chiefly in the product feed tube retainer fitting, all other structure being the same.

The valve body, generally indicated by reference numeral 118 has an extension 119 which has an axial threaded bore 120. The bore 120 has an annular shoulder 121 against which bears the annular flange 122 of a retainer fitting 123 for the product feeder or inlet tube 124. The threaded stem 125 on a nut 126 is compressed against the tapered portion 127 of the fitting 123 when the nut is turned, causing the fitting to clamp on the tube 124, holding the same against longitudinal displacement.

The product enters a seating area and fluid transition chamber 128 in which the tapered forward end 129 of the fitting 123 serves as a seat for the diaphragm 130. The diaphragm 130 has an annular flange 131 which is received in an annular recess 132 in the end 133 of a sleeve 134. The sleeve 134 has an annular shoulder 135 against which bears a flange 136 of a nut 137 which is threaded onto an extension 138 of the body 118 opposite the extension 119 thereof. Thus, the sleeve 134 is held in place on the valve body.

Within the sleeve 134 reciprocates a solenoid plunger 139 which is normally urged against the diaphragm 130 by a coil spring 140 disposed in an axial bore 141 in the plunger 139. The inner end of the spring 140 bears against the bottom of the bore 141 while its outer end bears against a spring retaining member 142 held in the outer end of the sleeve 134 by engagement of the threads of an intermediate portion 143 thereof with the internal threads of the outer end 144 of the sleeve 134. The stem 145 of the retaining member 142 is threaded to receive a nut 146 which bears against a solenoid housing 147, containing the solenoid coil 148, and thus holds the coil and housing on the valve body 118.

The action of the spring 140 holds the plunger 139 against the diaphragm and the diaphragm against the seat 129, thereby sealing off product seeking to enter the seating area 128. When the solenoid coil 148 is energized, the plunger is retracted against the resistance of the spring 140, releasing the fluid into the seating area 128 and therefrom through the passage 149 and nozzle 150 for discharge.

The diaphragm 130 has a circular boss 151 in its center which is engaged by the end of the plunger 139. This boss reinforces the diaphragm and provides a more positive seal against the seat 129.

In Figs. 8, 9 and 10 is shown a further modification of the valve illustrated in the preceding figures of the drawing and described in the foregoing. In Fig. 8 the valve, generally indicated by reference numeral 160 is shown associated with a beverage flavor selector mechanism for which it was primarily designed.

The valve consists of a sleeve 161 in which reciprocates a plunger 162 which has formed on one end a head 163 which is larger in diameter than the plunger itself, thereby providing an annular shoulder 164 (Fig. 10) against which bears one end of a coil spring 165. The opposite end of the spring 165 bears against the end of the bore 166 of the sleeve and surrounds the body of the plunger 162. Accordingly, the spring normally biases the plunger toward the snap-on diaphragm 167 which is formed with an annular flange 168, having an internal annular bead 169 which lies in a correspondingly shaped groove 170 in the wall of the sleeve 161. The diaphragm 167 has a circular boss 171 formed on its inner surface which is slidable in a cavity 172 in the end of the plunger 162.

The valve 160 is conformably disposed in a bore 173 (Fig. 8) of a block 174 which is a part of the selector mechanism. There are four identical valves 160 arranged in bores in the block 174. By observing Fig. 9, reference numerals 160 and 175 represent control valves for either plain or carbonated water while numerals 176 and 177 represent valves controlling the flow of syrup of different flavors which becomes mixed with water in the block 174.

Each valve is confronted by an inlet fitting 177a (Fig. 8) arranged in a bore such as the bore 178 in the block 174, which is of slightly smaller diameter than the bore 173 in which the valve is disposed. An O-ring 179 is seated in an annular groove 180 in the body of the fitting 177a and bears against the walls of the bore 178. A nipple 181 is provided on the outer end of each fitting 177 to which is attached a flexible tube (not shown) of polyethylene, which extends to a suitably refrigerated storage tank, not shown.

Each fitting 181 is formed with a seat 182 in a seating and fluid transition area 183 and against which the diaphragm 167 is urged by the plunger 162 under pressure of the spring 165. Thus, each valve is held normally closed and is opened by energization of a solenoid, generally indicated by reference numeral 184. The valves are held against longitudinal displacement in their respective bores by the heads 185 of screws 186 and the fittings 181 are similarly held by the heads 187 of screws 188 (Fig. 8), the screws entering threaded holes in the block 174 so that their heads will overreach projecting parts on the valves and fittings.

Water and syrup entering the seating areas 183 when the valve plungers are retracted by the solenoid find release through passages such as the passage 189 (Fig. 8) with which communicate the axial passages such as passage 190 in an outlet fixture 191, each of which fixture has a nipple 192 to which is attached a flexible line, not shown, leading to a discharge point. These fixtures are each held in place by a screw 193 whose head 194 overreaches a projecting part of the fixture.

The water valves 160 and 175 (Fig. 9) have stems 195 and 196, respectively and the syrup valves 176 and 177 have stems 197 and 198, respectively. The valve stem 195 carries a head 198a, the stem 196, a head 199, stem 197, a head 200 and the stem 198, a head 201, as shown in Fig. 9. A selector plate 202 is mounted on the inner end of a selector shaft 203 which extends entirely through the block 174 to its front end where a coil spring 204 surrounds the shaft, one end bearing against the block while its opposite end bears against a washer 205 affixed to the shaft 203 near its end, thereby exerting a longitudinal force thereon tending to pull the selector plate 202 inwardly toward the block 174. A nut 206 is threaded onto the shaft 203 inwardly of its rear ends and bears against the selector plate 202, holding the same rigid with the selector shaft, so that when the latter is rotated by a patron of the vending machine, the selector plate will be correspondingly rotated to engage the stem of the valve which will release the selected flavor of syrup as well as the stem of the valve which will start the flow of either carbonated or plain water. For example, a flavor such as orange will be released by a valve opposite a valve which will release plain water while a syrup flavor which is more palatable with carbonated water will be opposite a valve which will release carbonated water.

The selector plate 202 has its end portions 207 and 208 extending laterally between the stems 195 and 196 and 197 and 198, respectively, of the valves 160, 175 and 176 and 177. When the shaft 203 is rotated in the selection of a flavor, say, a flavor controlled by valve 176, the end 208 of the selector plate will move toward the stem 200 of this valve and a notch a in the edge of the said end 208 of the plate will engage the stem 200. At the same time, a notch b in the opposite edge of the opposite end 207 of the selection plate will engage the stem 196 of the valve 175.

When the selector plate 202 is positioned as above described, energization of the solenoid 184 will cause its armature 209 to be retracted, bringing the cotter pin 210 therein against the upper end of a selector shaft retracting finger 211 and causing the finger to rock against the upwardly extending stop plate 212. The finger 211 has an aperture 213 in a portion 214 thereof spaced upwardly from the lower end of the finger, the said aperture receiving the end 215 of the selector shaft 203 and the portion 214 being struck outwardly to form a bearing surface engaging a washer 216 secured to the end of the selector shaft.

When the finger 211 is tilted on the fulcrum provided by the upstanding plate 212, the selector shaft 203 is moved longitudinally in a rearward direction, bringing with it the selector plate 202 which is in engagement with the stems 196 and 197 of the water valve 175 and syrup valve 176, respectively. As the plate moves outwardly it is brought up against the heads 199 and 200 of the valves 175 and 176, respectively, causing the plungers of these valves to be retracted against their biasing springs and moving their diaphragms away from their respective seats so the water and the selected syrup will flow simultaneously through the discharge nipples.

When the selector plate 202 has been moved rearwardly, it lies in the same plane as the heads 198a and 201 of valves 160 and 177, respectively. Thus, any attempt to rotate the selector shaft while the valves 175 and 176 are open during the drawing of a cup of beverage will be defeated because the edges of the selector plate, in which notches c and d are made, will be brought up against the said heads 198a and 201, preventing further rotation of the selector plate until the solenoid 184 is deenergized and the spring 204 returns the selector shaft and selector plate to its original position. Valves 160 and 177 are actuated in the same manner as above described, the selector shaft being rotated in the opposite direction to cause engagement of the notches c and d of the selector plate with the stems 195 and 198 of the valves 160 and 177, respectively. In like manner, the plate 202 is prevented from being rotated while the solenoid 184 is energized by its being in the same plane with the heads 199 and 200 of valves 175 and 176.

It is clearly evident from the foregoing that each of the four valves herein disclosed has a sealed area between the high pressure product and the moving parts of the valve insuring against any infiltration of syrup containing product, which would be fatal to continuous successful performance of a beverage vending or dispensing machine and that the area sealed off by the diaphragm is kept clean by the frequent washing action of the $CO_2$ water.

Manifestly, the construction as shown and described is capable of some modification and such modification as may be construed to fall within the scope and meaning of the appended claims is also considered to be within the spirit and intent of the invention.

What is claimed is:

1. In a valve for dispensing carbonated beverages, a valve body having a side inlet and a bottom outlet, an inlet nipple in the inlet and a discharge nozzle in the outlet, a valve seat in the body aligned axially with the inlet nipple, a solenoid having a housing connected to the side of the body opposite the inlet, a sleeve extending through the core of the solenoid coil and having its inner end received in a bore formed in the body opposite the inlet, a cup shaped diaphragm having an annular flange surrounding the inner end of the sleeve, the solenoid plunger being reciprocable in the sleeve and being acted upon by a spring whereby it normally urges the diaphragm in seating engagement with the valve seat and is retracted relative thereto upon energizing the solenoid coil, the diaphragm having a thickened central portion adapted to be compressed between the valve seat and the plunger and an internal annular bead formed on the annular flange engaging with an annular peripheral groove formed in the sleeve, the arrangement being such that the diaphragm may be snapped on the adjacent end of the sleeve whereby the solenoid may be attached to and withdrawn from the valve body with the diaphragm attached to the sleeve.

2. A valve as described in claim 1 in which the discharge nozzle has an axial fluid passage of progressively increasing diameter from its inlet end to its outlet end, the passage having straight walled end portions and a tapering intermediate portion in which the taper of the wall of the passage gradually increases from zero to substantially 6 degrees, the arrangement being such that back pressure is held on the valve chamber while the carbonated beverage is allowed to expand progressively, as it loses velocity, so that it is discharged from the nozzle in a slow, non-turbulent stream, without foaming.

References Cited in the file of this patent

UNITED STATES PATENTS

| | | |
|---|---|---|
| 2,208,490 | Axtell et al. | July 16, 1940 |
| 2,553,940 | Quartullo | Mar. 22, 1951 |
| 2,668,083 | Kirchner | Feb. 2, 1954 |

FOREIGN PATENTS

| | | |
|---|---|---|
| 832,817 | Germany | Feb. 28, 1952 |